(12) United States Patent
Lu

(10) Patent No.: US 12,720,387 B2
(45) Date of Patent: Aug. 25, 2026

(54) USER EQUIPMENT (UE) SPEED AWARENESS MOBILITY

(71) Applicant: T-Mobile USA, Inc., Bellevue, WA (US)

(72) Inventor: Kun Lu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 309 days.

(21) Appl. No.: 18/421,985

(22) Filed: Jan. 24, 2024

(65) Prior Publication Data

US 2025/0240684 A1 Jul. 24, 2025

(51) Int. Cl.

| | |
|---|---|
| ***H04W 36/06*** | (2009.01) |
| ***H04W 36/32*** | (2009.01) |
| ***H04W 72/51*** | (2023.01) |
| ***H04W 72/563*** | (2023.01) |

(52) U.S. Cl.
CPC ......... *H04W 36/06* (2013.01); *H04W 36/324* (2023.05); *H04W 72/51* (2023.01); *H04W 72/563* (2023.01)

(58) Field of Classification Search
CPC ... H04W 36/06; H04W 36/324; H04W 72/51; H04W 72/563
See application file for complete search history.

(56) References Cited

U.S. PATENT DOCUMENTS

| | | | | |
|---|---|---|---|---|
| 9,451,521 | B2 | 9/2016 | Kapoulas et al. | |
| 2013/0023302 | A1 | 1/2013 | Sivanesan et al. | |
| 2014/0141785 | A1* | 5/2014 | Wang .................. | H04W 36/324 455/441 |
| 2025/0267513 | A1* | 8/2025 | Sharma ............. | H04W 28/0861 |

OTHER PUBLICATIONS

LG Electronics R2-168737, 'Cell reselection for NR', Nov. 14-18, 2016, 3GPP TSG-RAN WG2 Meeting #96, pp. 1-2. (Year: 2016).*
International Search Report and Written Opinion received in International Application No. PCT/US2024/059409 mailed on Apr. 8, 2025, 11 pages.

* cited by examiner

*Primary Examiner* — Melvin C Marcelo
(74) *Attorney, Agent, or Firm* — Foley IP Law, PLLC

(57) ABSTRACT

User equipment (UE) speed awareness for mobility management reduces handovers for rapidly moving UEs that are in connected mode, reducing handover-induced dropped calls and traffic interruptions. Examples determine a speed of a UE and, based on at least determining that the speed of the UE exceeds a first threshold speed, prioritize the lowest available frequency band for the UE. Prioritizing the lowest frequency band comprises: based on at least the UE already using the lowest frequency band: not instructing the UE to perform an inter-frequency measurement; and/or not performing an inter-frequency handover to a higher frequency band; and based on at least the UE not already using the lowest frequency band: instructing the UE to perform an inter-frequency measurement for the lowest frequency band; and based on at least the lowest frequency band being available for the UE, instructing a handover of the UE to the lowest frequency band.

20 Claims, 7 Drawing Sheets

Figure 1:
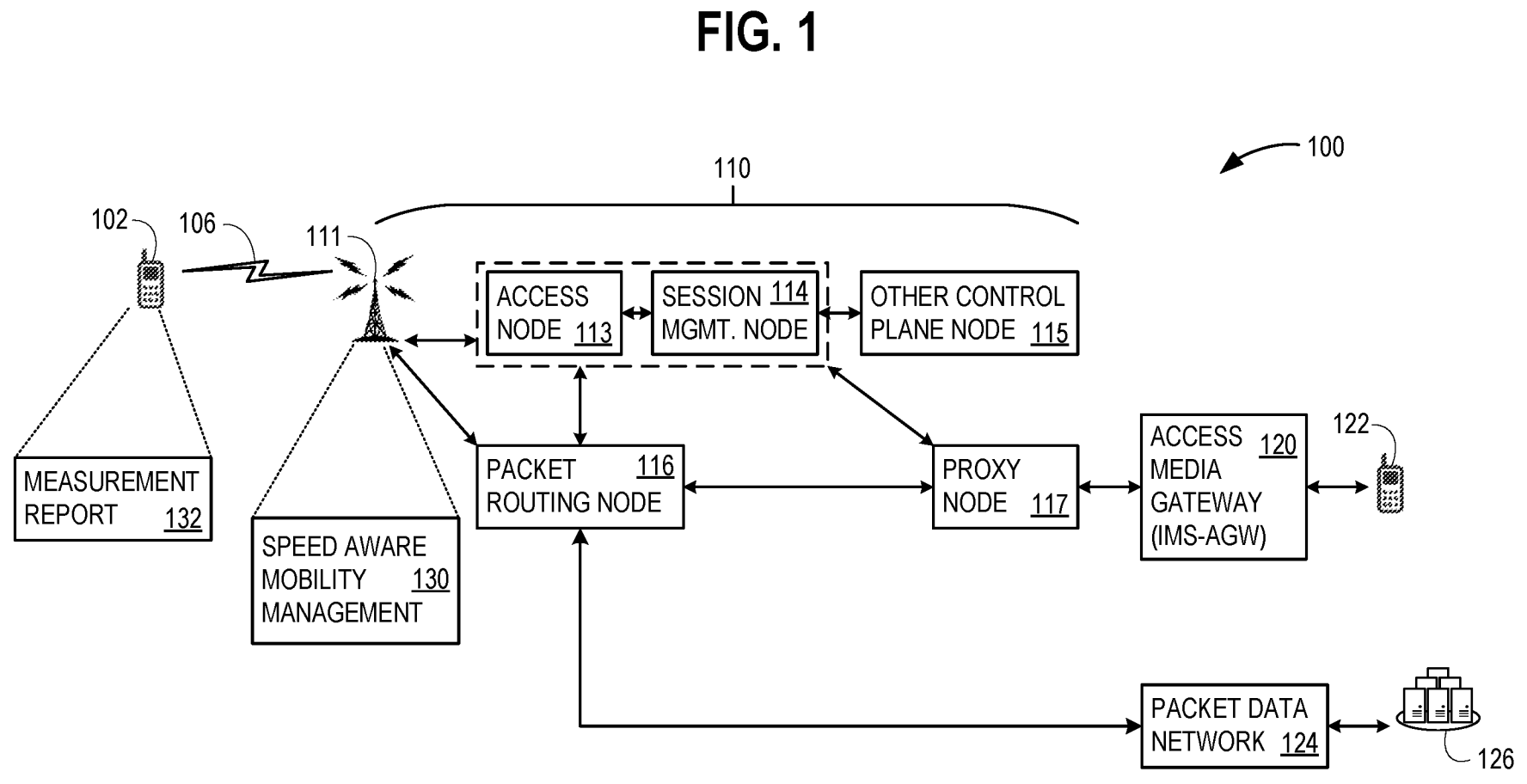

MEASUREMENT REPORT 132

102

106

111

SPEED AWARE MOBILITY MANAGEMENT 130

ACCESS NODE 113

SESSION MGMT. NODE 114

OTHER CONTROL PLANE NODE 115

PACKET ROUTING NODE 116

PROXY NODE 117

ACCESS MEDIA GATEWAY (IMS-AGW) 120

122

PACKET DATA NETWORK 124

126

HIGHEST FREQUENCY BAND 201
LOWER FREQUENCY BAND 202
LOWEST FREQUENCY BAND 203
200
111
321
331
213
212
211
223
222
221
233
232
231
102
206
Moving slowly
240
241
242
243
244
245
246
247
248
249
250
251
252
253
254
255
TIME
HO 261
HO 262
HO 263
HO 264
HO 265
HO 266
HO 267
HO 268
HO 269
HO 270
HO 271
HO 272
HO 273
HO 274

300
340
TIME
TIME
TIME
HIGHEST FREQUENCY BAND 201
LOWER FREQUENCY BAND 202
LOWEST FREQUENCY BAND 203
111
211
212
213
321
221
222
223
331
231
232
233
102
206
Moving rapidly
341
342
343
HANDOVER 361
HANDOVER 362

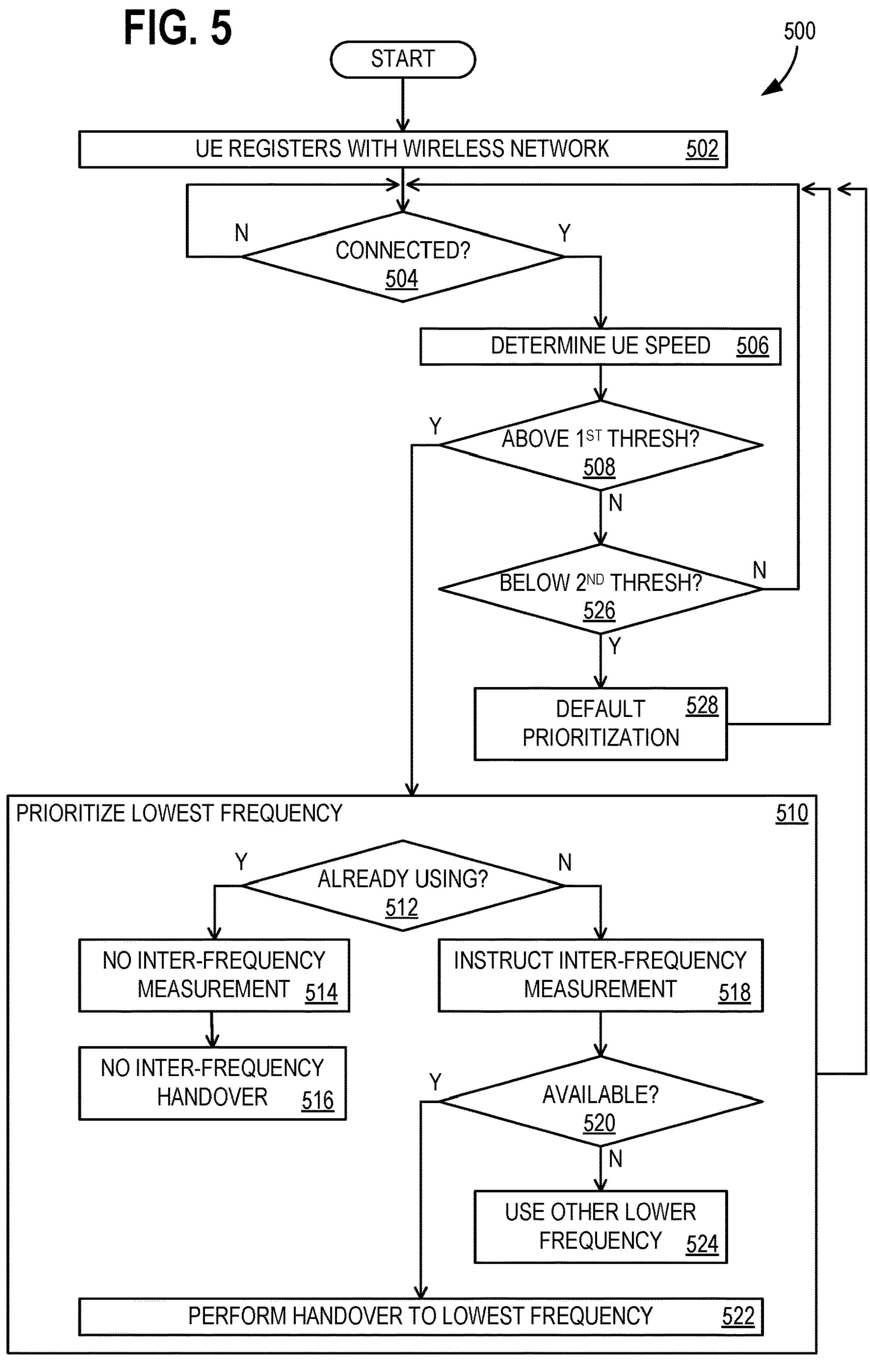
FIG. 5
500
START
UE REGISTERS WITH WIRELESS NETWORK 502
CONNECTED? 504
N
Y
DETERMINE UE SPEED 506
ABOVE 1ST THRESH? 508
Y
N
BELOW 2ND THRESH? 526
N
Y
DEFAULT PRIORITIZATION 528
PRIORITIZE LOWEST FREQUENCY 510
ALREADY USING? 512
Y
N
NO INTER-FREQUENCY MEASUREMENT 514
INSTRUCT INTER-FREQUENCY MEASUREMENT 518
NO INTER-FREQUENCY HANDOVER 516
AVAILABLE? 520
Y
N
USE OTHER LOWER FREQUENCY 524
PERFORM HANDOVER TO LOWEST FREQUENCY 522

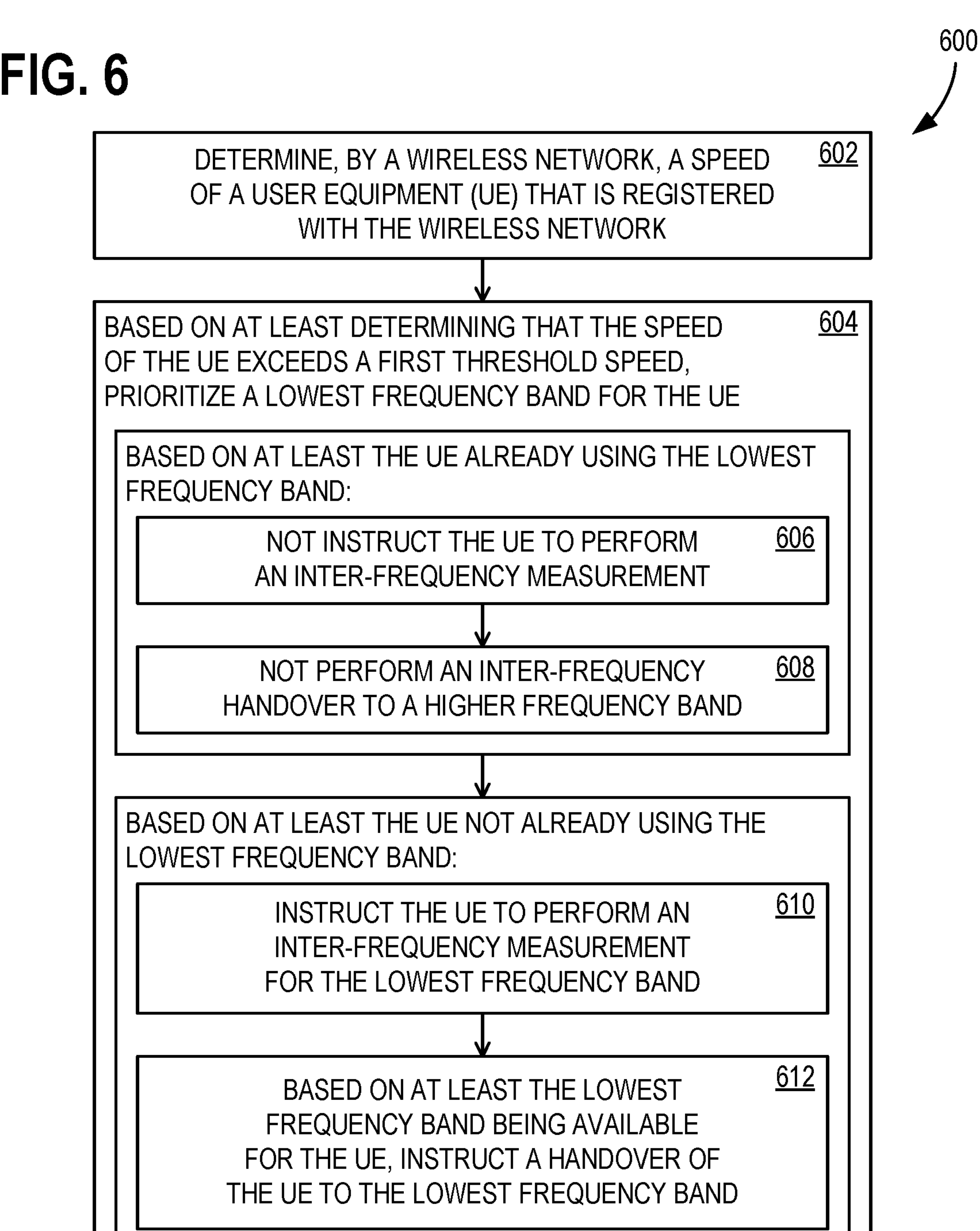
FIG. 6
600
DETERMINE, BY A WIRELESS NETWORK, A SPEED OF A USER EQUIPMENT (UE) THAT IS REGISTERED WITH THE WIRELESS NETWORK
602
BASED ON AT LEAST DETERMINING THAT THE SPEED OF THE UE EXCEEDS A FIRST THRESHOLD SPEED, PRIORITIZE A LOWEST FREQUENCY BAND FOR THE UE
604
BASED ON AT LEAST THE UE ALREADY USING THE LOWEST FREQUENCY BAND:
NOT INSTRUCT THE UE TO PERFORM AN INTER-FREQUENCY MEASUREMENT
606
NOT PERFORM AN INTER-FREQUENCY HANDOVER TO A HIGHER FREQUENCY BAND
608
BASED ON AT LEAST THE UE NOT ALREADY USING THE LOWEST FREQUENCY BAND:
INSTRUCT THE UE TO PERFORM AN INTER-FREQUENCY MEASUREMENT FOR THE LOWEST FREQUENCY BAND
610
BASED ON AT LEAST THE LOWEST FREQUENCY BAND BEING AVAILABLE FOR THE UE, INSTRUCT A HANDOVER OF THE UE TO THE LOWEST FREQUENCY BAND
612

USER EQUIPMENT (UE) SPEED AWARENESS MOBILITY

BACKGROUND

Cellular wireless networks often prioritize the highest available frequency band for a user equipment (UE) that is transmitting a large amount of data, because the higher frequency bands often have more bandwidth and thus are expected to provide greater throughput. However, when a UE moves a sufficient distance that a handover to another cell (e.g., a neighbor cell) is required, the handover temporarily interrupts the data flow.

UEs are commonly used in vehicles, for example in an automobile that is traveling down a road. When the UE is within an automobile that is moving at a significant speed, handovers between cells may be more frequent than when the UE is moving slowly or is stationary. The high rate of handovers not only reduces the throughput of data (thereby reducing network efficiency), but the likelihood of a handover-induced call drop is increased.

SUMMARY

The following summary is provided to illustrate examples disclosed herein, but is not meant to limit all examples to any particular configuration or sequence of operations.

Solutions are disclosed that provide user equipment (UE) speed awareness for mobility management. Examples include: determining, by a wireless network, a speed of a UE that is registered with the wireless network; and based on at least determining that the speed of the UE exceeds a first threshold speed, prioritizing the lowest frequency band for the UE, wherein prioritizing the lowest frequency band comprises: based on at least the UE already using the lowest frequency band: not instructing the UE to perform an inter-frequency measurement; and/or not performing an inter-frequency handover to a higher frequency band; and based on at least the UE not already using the lowest frequency band: instructing the UE to perform an inter-frequency measurement for the lowest frequency band; and based on at least the lowest frequency band being available for the UE, instructing a handover of the UE to the lowest frequency band.

BRIEF DESCRIPTION OF THE DRAWINGS

The disclosed examples are described below with reference to the accompanying drawing figures listed below, wherein:

FIG. 1 illustrates an exemplary architecture that advantageously provides user equipment (UE) speed awareness for mobility management;

FIGS. 5 and 6 illustrate flowcharts of exemplary operations associated with the architecture of FIG. 1.

Figure 2:
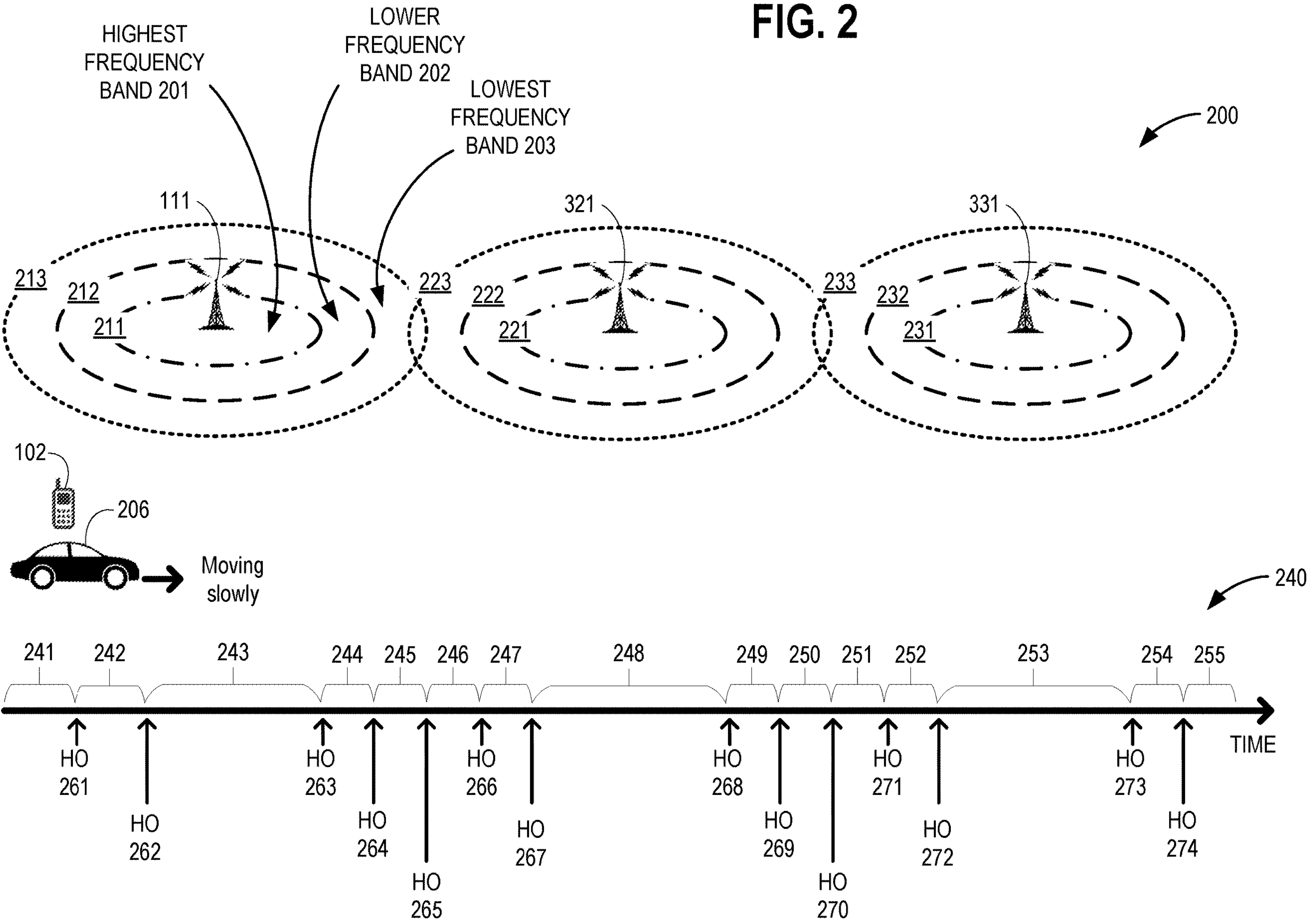
FIG. 2 illustrates the UE of FIG. 1 moving among multiple cells at a relatively low speed.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

User equipment (UE) speed awareness for mobility management reduces handovers for rapidly moving UEs that are in connected mode, reducing handover-induced dropped calls and traffic interruptions. Examples determine a speed of a UE and, based on at least determining that the speed of the UE exceeds a first threshold speed, prioritize the lowest available frequency band for the UE. Prioritizing the lowest frequency band comprises: based on at least the UE already using the lowest frequency band: not instructing the UE to perform an inter-frequency measurement; and/or not performing an inter-frequency handover to a higher frequency band; and based on at least the UE not already using the lowest frequency band: instructing the UE to perform an inter-frequency measurement for the lowest frequency band; and based on at least the lowest frequency band being available for the UE, instructing a handover of the UE to the lowest frequency band.

Aspects of the disclosure improve the reliability of cellular networks by reducing the number of handovers of UEs that are moving rapidly. This is because lower frequency bands typically provide longer range, so that a UE is able to move a further distance before a handover is required. Thus, given a certain amount of travel, the UE may experience a lower number of handovers. These advantageous result is accomplished, at least in part by, based on at least determining that the speed of the UE exceeds a first threshold speed, prioritizing the lowest frequency band for a UE.

With reference now to the figures, FIG. 1 illustrates an exemplary architecture 100 that advantageously provides UE speed awareness for mobility management. A wireless network 110 is illustrated that is serving a UE 102. UE 102 may be a cellular telephone, such as a smartphone, but may also represent other telecommunication devices capable of using a wireless network, such as a personal computer (PC, e.g., desktop, notebook, tablet, etc.) with a cellular modem.

In the scene depicted in FIG. 1, UE 102 is using wireless network 110 for a packet data session to reach a network resource 126 (e.g., a website) across an external packet data network 124 (e.g., the internet). In some scenarios, UE 102 may use wireless network 110 for a phone call with another UE 122. Wireless network 110 may be a cellular network such as a fifth generation (5G) network, a fourth generation (4G) network, or another cellular generation network.

UE 102 uses an air interface 106 to communicate with a base station 111 of wireless network 110, such that base station 111 is the serving base station for UE 102 (providing the serving cell). In some scenarios, base station 111 may be referred to as a radio access network (RAN). Wireless network 110 has an access node 113, a session management node 114, another representative control plane node 115, and other components (not shown). Wireless network 110 also has a packet routing node 116 and a proxy node 117. Access node 113 and session management node 114 are within a control plane of wireless network 110, and packet routing node 116 is within a user plane of wireless network 110.

Base station 111 is in communication with access node 113 and packet routing node 116. Access node 113 is in communication with session management node 114, which is in communication with packet routing node 116 and proxy node 117. Packet routing node 116 is in communication with proxy node 117, and packet data network 124. In some 5G examples, base station 111 comprises a gNodeB (gNB), access node 113 comprises an access mobility function (AMF), session management node 114 comprises a session management function (SMF), and packet routing node 116 comprises a user plane function (UPF).

In some 4G examples, base station 111 comprises an eNodeB (eNB), access node 113 comprises a mobility management entity (MME), session management node 114 comprises a system architecture evolution gateway (SAEGW) control plane (SAEGW-C), and packet routing node 116 comprises an SAEGW-user plane (SAEGW-U). In some examples, proxy node 117 comprises a proxy call session control function (P-CSCF) in both 4G and 5G.

In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations. For example, wireless network may use both a gNB and an eNB co-located at a common cell site. In some examples, multiple cells may be co-located at a common cell site, and may be a mix of 5G and 4G.

Proxy node 117 is in communication with an internet protocol (IP) multimedia system (IMS) access gateway (IMS-AGW) 120 within an IMS, in order to provide connectivity to other wireless (cellular) networks, such as for a call with UE 122 or a public switched telephone system (PSTN, also known as plain old telephone system, POTS). In some examples, proxy node 117 may be considered to be within the IMS. UE 102 reaches network resource 126 using packet data network 124 (or IMS-AGW 120, in some examples). Data packets from UE 102 pass through at least base station 111 and packet routing node 116 on their way to packet data network 124 or IMS-AGW 120 (via proxy node 117).

Typically, a handover in wireless network 110 begins with UE 102 measuring neighboring cells to determine whether a handover is warranted. Base station 111 instructs UE 102 when to make neighbor cell measurements, how long to take for the measurements, and what frequencies to measure. When UE 102 has measurement results satisfying some reporting criteria, it sends a measurement report 132 to base station 111. Measurement report 132 may include a mobility event such as an Event A3 (i.e., a neighbor cell is better than the serving cell by an offset), or an Event A2 (i.e., the serving cell signal falls below a threshold), or A5 (i.e., serving cell becomes worse than A5 Threshold 1 and neighbor cell becomes better than A5 Threshold 2). Wireless network 110 then instructs UE 102 to move from the current serving cell to another cell (e.g., a neighbor cell), either at the same frequency layer or a different frequency layer, using a handover command (HO command). The HO command normally comes to UE 102 through an RRCReconfiguration message that contains the radio parameters UE 102 needs in order to connect to the target cell (i.e., the new cell to which UE 102 is being handed over). Typically, wireless network 110 prioritizes higher frequencies (e.g., the highest frequency band, or highest frequency layer, available) for connected UEs, due to the better throughput, when network load balancing and other factors permit.

A speed aware mobility management logic 130 within base station 111 alters the typical management of UE mobility. Speed aware mobility management logic 130 determines whether UE 102 is moving at a speed above a threshold speed, and if so changes the prioritization from the default network behavior to favor lower frequencies (e.g., the lowest frequency band, or lowest frequency layer, available). The operations of speed aware mobility management logic 130 are described in further detail below. Although speed aware mobility management logic 130 is illustrated as being within base station 111, some examples may place speed aware mobility management logic 130 elsewhere within wireless network 110, and/or distribute its functionality among multiple locations.

FIG. 2 illustrates UE 102 traversing past three call sites, through multiple cells, at a relatively low speed in a scenario 200. For simplicity of illustration, each cell site and all of the RAN nodes at each cell site that provide the cells are represented by a single base station, and angle-dependent sectors are omitted. Base station 111 represents the first cell site, in which UE 102 starts the illustrated journey, with a high frequency band cell 211, a mid-frequency band cell 212, and a low frequency band cell 213. A base station 321 represents the second cell site, past which UE 102 travels, with a high frequency band cell 221, a mid-frequency band cell 222, and a low frequency band cell 223. A base station 331 represents the third cell site, past which UE 102 travels, with a high frequency band cell 231, a mid-frequency band cell 232, and a low frequency band cell 233.

In this illustrated example, each of high frequency band cell 211, high frequency band cell 221, and high frequency band cell 231 uses a highest frequency band 201; each of mid-frequency band cell 212, mid-frequency band cell 222, and mid-frequency band cell 232 uses a lower frequency band 202; and each of low frequency band cell 213, low frequency band cell 223, and low frequency band cell 233 uses a lowest frequency band 203. Lower frequency band 202 is lower in frequency than highest frequency band 201, but above lowest frequency band 203. For example, highest frequency band 201 may be in the 2500 megahertz (MHz) set of cellular frequencies, lower frequency band 202 may be in the 1700 MHz to 2200 MHz set of cellular frequencies, and lowest frequency band 203 may be in the 600 MHz to 700 MHz set of cellular frequencies. Although three frequency bands (frequency layers) are shown for each cell site, some examples may user a different number of frequency bands, such as two at some cell sites, four at some cell sites, and other arrangements. The different cells may use time domain duplexing (TDD), frequency domain duplexing (FDD), and combinations of TDD and FDD.

In the illustration of FIG. 2, each of low frequency band cell 213, low frequency band cell 223, and low frequency band cell 233 is shown as having the longest notional range at each cell cite, followed by mid-frequency band cell 212, mid-frequency band cell 222, and mid-frequency band cell 232 each having somewhat of a lesser range, and each of high frequency band cell 211, high frequency band cell 221, and high frequency band cell 231 having the shortest range. This is a generalized representation of the observable phenomenon that lower frequencies typically provide larger coverage areas in cellular networks.

UE 102 is inside a vehicle 206, such as an automobile on a road, which is driving at a relatively low speed, when measured as a rate of radial distance change relative to each of base stations 111, 321, and 331. Each base station that serves UE 102 determines the radial speed of UE 102, relative to itself, in order to determine a timing advance (TA). Thus, it is already common for cellular base stations to have the capability to determine at least the radial component of a served UE's speed.

When UE 102 starts the illustrated journey, in the vicinity of base station 111, and is being served by low frequency band cell 213, high frequency band cell 211 and mid-frequency band cell 212 are neighbor cells. Because UE 102 is moving slowly, and will have significant dwell time within each cell, even if UE 102 performs inter-frequency handovers while still within the vicinity of base station 111, the handovers will be relatively far apart in time. Thus, base station 111 instructs UE 102 to perform inter-frequency measurements of neighbor cells (high frequency band cell 211 and mid-frequency band cell 212). If UE 102 remains at a relatively low speed also while within the vicinities of base stations 321 and 331, base stations 321 and 331 will similarly instruct UE 102 to perform inter-frequency measurements of neighbor cells (high frequency band cell 221 and mid-frequency band cell 222 and then high frequency band cell 231 and mid-frequency band cell 232).

Due to the typical preference for moving UEs to higher frequencies, in order to provide greater bandwidth, as UE 102 travels along, it will experience several handovers, as shown on a timeline 240. Initially, during a time period 241, UE 102 is being served by low frequency band cell 213. As UE 102 moves closer to the tower where base station 111 is located (and other RANs at the cell site represented by base station 111), a handover (HO) 261 moves UE 102 to mid-frequency band cell 212 for a time period 242. As UE 102 moves even closer to the tower, a handover 262 moves UE 102 to high frequency band cell 211 for a time period 243.

High frequency band cell 211 continues to serve UE 102 until UE 102 moves far enough away from the tower represented by base station 111 that a handover 263 moves UE 102 back to mid-frequency band cell 212 for a time period 244. (In examples with angle-dependent sectors, a different mid-frequency band cell may instead be used.) As UE 102 continues to move even further away from the tower, a handover 264 moves UE 102 back to low frequency band cell 213 (or another angle-dependent low frequency band cell sector) for a time period 245.

As UE 102 leaves the vicinity of base station 111 and enters the vicinity of base station 321, a handover 265 moves UE 102 to low frequency band cell 223 for a time period 246. The cycle to higher frequencies and then back down is repeated. As UE 102 moves closer to the tower where base station 321 is located (and other RANs at the cell site represented by base station 321), a handover 266 moves UE 102 to mid-frequency band cell 222 for a time period 247, then handover 267 moves UE 102 to high frequency band cell 221 for a time period 248. As UE 102 starts moving away from the vicinity of base station 111, a handover 268 moves UE 102 back to mid-frequency band cell 222 for a time period 249, then a handover 269 moves UE 102 back to low frequency band cell 223 for a time period 250.

A similar cycle from lower to higher frequencies and then back down is repeated as UE 102 enters and then moves away from the vicinity of base station 321. A handover 270 moves UE 102 to low frequency band cell 233 for a time period 251, a handover 271 moves UE 102 to mid-frequency band cell 232 for a time period 252, a handover 272 moves UE 102 to high frequency band cell 231 for a time period 253, a handover 273 moves UE 102 back to mid-frequency band cell 232 for a time period 254, and then a handover 274 moves UE 102 back to low frequency band cell 233 for a time period 255. This is a total of 14 handovers during the journey of UE 102, as represented by timeline 240.

Figure 3:
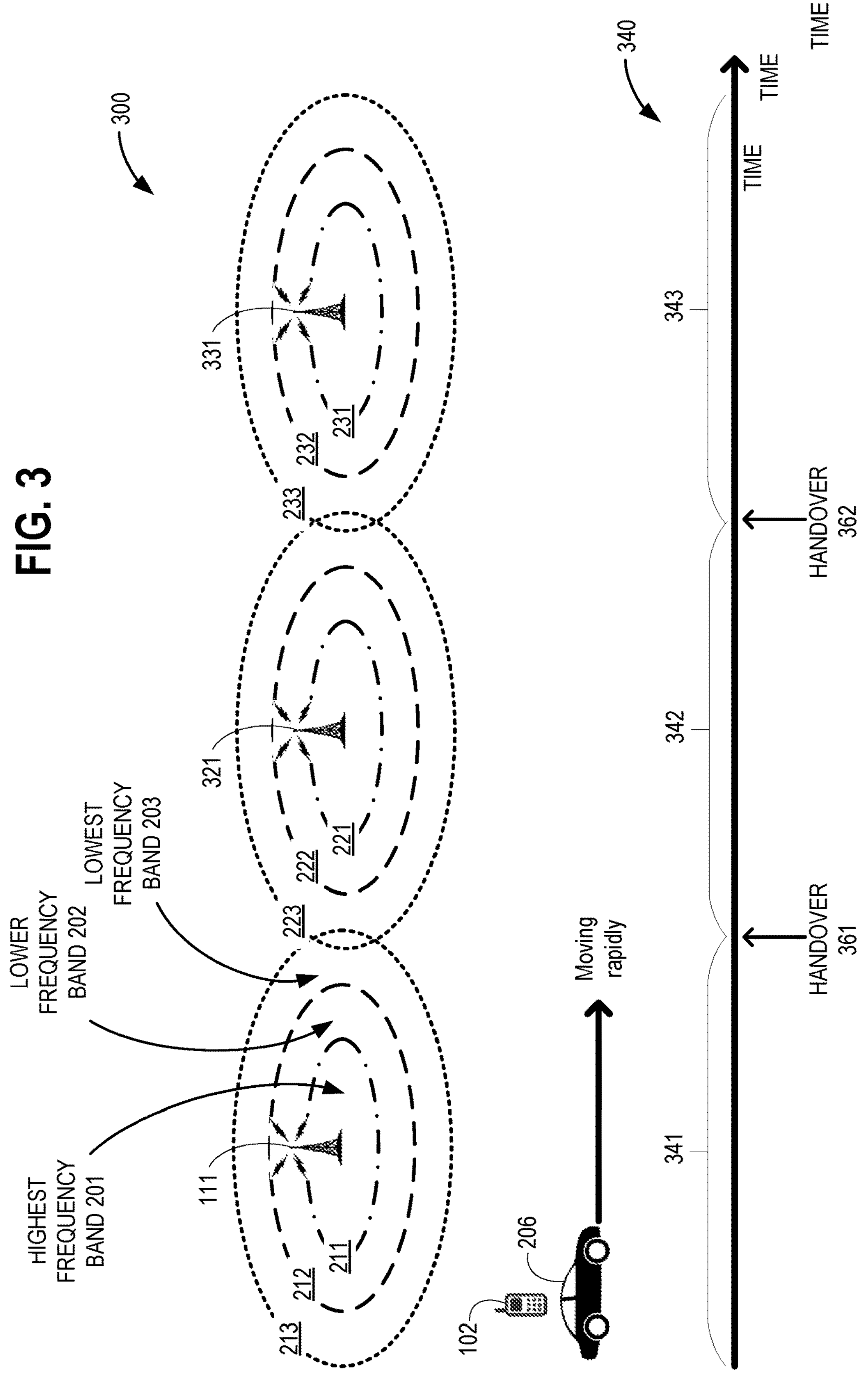
FIG. 3 illustrates the UE of FIG. 1 moving among multiple cells at a relatively high speed.

FIG. 3 illustrates UE 102 traversing past the same three call sites of FIG. 2, but this time at a relatively high speed in a scenario 300. Because UE 102 is moving at a relatively high speed, speed aware mobility management logic 130 causes base station 111 suspends inter-frequency measurements for UE 102, although base station 111 does not suspend intra-frequency measurements for UE 102. This action results in UE 102 having a handover from low frequency band cell 213 to low frequency band cell 223, but no handovers to mid-frequency band cell 212 or high frequency band cell 211. Base stations 321 and 331 also have a version of speed aware mobility management logic 130, and so act similarly.

The result of this is significant. Whereas there were 14 handovers in scenario 200 of FIG. 2, there are only 2 handovers in scenario 300 of FIG. 3, and which are shown on a timeline 340. This provides a significant reduction in the risk of a handover-induced call drop, as well as reduces measurement gap interruptions in data flow, improving the throughput of wireless network 110.

As illustrated in FIG. 3, while UE 102 remains within the vicinity of base station 111, UE 102 is served by low frequency band cell 213 during a time period 341. As UE 102 leaves the vicinity of base station 111 and enters the vicinity of base station 321, a handover 361 moves UE 102 to low frequency band cell 223 for a time period 342. As UE 102 leaves the vicinity of base station 321 and enters the vicinity of base station 331, a handover 362 moves UE 102 to low frequency band cell 233 for a time period 343. The number of handovers has been reduced from 14 to 2, based on the speed of UE 102.

If the journey had instead started with UE 102 being served by high frequency band cell 211, base station would not have suspended inter-frequency measurements for UE 102 until UE 102 had moved to the low frequency band cell (e.g., low frequency band cell 213). This would still reduce the number of handovers for UE 102, although from 14 to 3 or 4, depending on whether UE moved directly from to high frequency band cell 211 to low frequency band cell 213, or instead was also served (briefly) by mid-frequency band cell 212.

Figure 4:
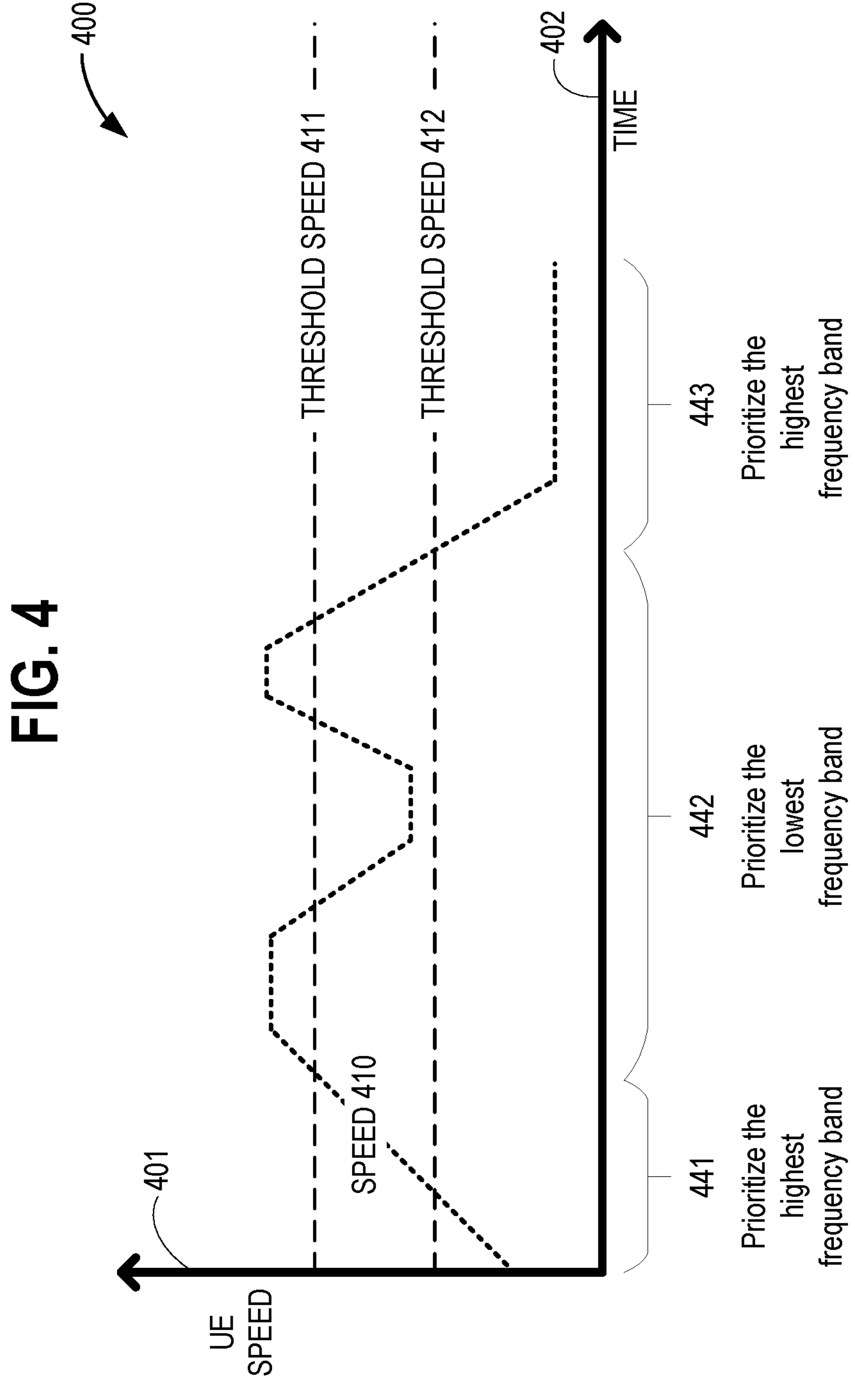
FIG. 4 illustrates a time-based plot of prioritizing and not prioritizing the lowest frequency band for the UE of FIG. 1, based on at least the speed of the UE.

FIG. 4 illustrates a time-based plot 400 of prioritizing and not prioritizing lowest frequency band 203 for UE 102, based on at least the speed of UE 102. A speed 410 of UE 102 is plotted using a UE speed axis 401 versus a time axis 402. Speed 410 may be radial speed of UE 102 relative to base station 111. During a time period 441, speed 410 rises from a relatively low speed (moving slowly), initially below a threshold speed 412 to above threshold speed 412 (but still below a threshold speed 411), and then up to threshold speed 411. During time period 441, wireless network 110 prioritizes highest frequency band 201 for UE 102, or some other default prioritization scheme.

In some examples, threshold speed 411 may be 60 kilometers per hour (kph), 64 kph, 79 kph, or another speed. In some examples, threshold speed 412 (which is lower than threshold speed 411) may be just below 60 kph, or 57 kph, or 41 kph, or another speed.

Upon speed 410 exceeding threshold speed 411, wireless network 110 changes to prioritizing lowest frequency band 203 during time period 442. In some examples, even if speed 410 drops below threshold speed 411, after wireless network 110 has changed to prioritizing lowest frequency band 203, wireless network 110 continues to prioritize lowest frequency band 203 until (and unless) speed 410 drops below threshold speed 412. This hysteresis-type behavior prevents ping-pong operation if UE 102 were to have a speed hovering around threshold speed 411. Upon speed 410 dropping below threshold speed 412, wireless network 110 changes back to prioritizing highest frequency band 201 during time period 443, or some other default prioritization scheme.

FIG. 5 illustrates a flowchart 500 of exemplary operations associated with examples of architecture 100. In some examples, at least a portion of flowchart 500 may be performed using one or more computing devices 700 of FIG. 7. Flowchart 500 commences with UE 102 registering with wireless network 110, in operation 502. Decision operation 504 determines whether UE 102 is in connected mode. If not, (e.g., UE 102 is in idle mode), flowchart 500 returns to decision operation 504 until UE 102 enters connected mode. There are no handovers for UEs in idle mode.

If UE 102 is in connected mode, wireless network 110 (e.g., speed aware mobility management logic 130 within base station 111) determines speed 410 of UE 102 in operation 506. In examples using TDD, wireless network 110 (determines speed 410 of UE 102 independently of providing UE speed awareness for mobility management. Decision operation 508 determines whether speed 410 exceeds threshold speed 411. If so, operation 510 prioritizes lowest frequency band 203 for UE 102 based on at least wireless network 110 (e.g., speed aware mobility management logic 130) determining that speed 410 of UE 102 exceeds threshold speed 411.

Operation 510 is performed using decision operation 512 through operation 524. Decision operation 512 determines whether UE 102 is already using lowest frequency band 203. If so, operation 514 prevents base station 111 from instructing UE 102 to perform an inter-frequency measurement. This may be accomplished, in some examples, by removing the inter-frequency measurement instruction from the RRC Reconfiguration message during the radio bearer setup stage. That is, UE 102 is instructed to perform only intra-frequency measurements. This precludes UE 102 sending a measurement report indicating a handover to a higher frequency layer (e.g., high frequency band cell 211). However, if UE 102 had already sent a measurement report indicating a handover to a higher frequency layer (or operation 514 is not performed), operation 516 stops any inter-frequency handover to a higher frequency band by preventing base station 111 from instructing UE 102 to perform an inter-frequency handover to a higher frequency band.

If, however, UE 102 is not already using lowest frequency band 203, in operation 518, base station 111 instructs UE 102 to perform an inter-frequency measurement, which includes at least lowest frequency band 203, and may also include lower frequency band 202. Decision operation 520 determines whether lowest frequency band 203 is available (e.g., a cell using lowest frequency band 203 is suitable for serving UE 102). If so, base station 111 instructs a handover of UE 102 to lowest frequency band 203, and the handover is performed in operation 522. If not, wireless network 110 uses the next best alternative, such as instructing and performing a handover of UE 102 to lower frequency band 202, in operation 524. Flowchart then returns to decision operation 504.

If decision operation 508 determines that speed 410 is below (or not above) threshold speed 412, decision operation 526 further determines whether speed 410 is below threshold speed 412. If not, flowchart returns to decision operation 504.

If, however, speed 410 is below threshold speed 412, speed aware mobility management logic 130 ceases to prioritize lowest frequency band 203 for UE 102 in operation 528. This returns wireless network to the default frequency layer prioritization for UE 102, which may be prioritizing highest frequency band 201. Flowchart then returns to decision operation 504.

FIG. 6 illustrates a flowchart 600 of exemplary operations associated with examples of architecture 100. In some examples, at least a portion of flowchart 600 may be performed using one or more computing devices 700 of FIG. 7. Flowchart 600 commences with operation 602, which includes determining, by a wireless network, a speed of a UE that is registered with the wireless network.

Operation 604 includes, based on at least determining that the speed of the UE exceeds a first threshold speed, prioritizing a lowest frequency band for the UE (i.e., the lowest frequency band provided by the wireless network that is available at the location of the UE). Prioritizing the lowest frequency band is performed using operations 606-612. Operations 606 and/or 608 are performed when the UE is already using the lowest frequency band, and operations 610 and 612 are performed when the UE is not already using the lowest frequency band.

Operation 606 includes not instructing the UE to perform an inter-frequency measurement, and operation 608 includes not performing an inter-frequency handover to a higher frequency band. Operation 610 includes instructing the UE to perform an inter-frequency measurement for the lowest frequency band, and operation 612 includes, based on at least the lowest frequency band being available for the UE, instructing a handover of the UE to the lowest frequency band.

Figure 7:
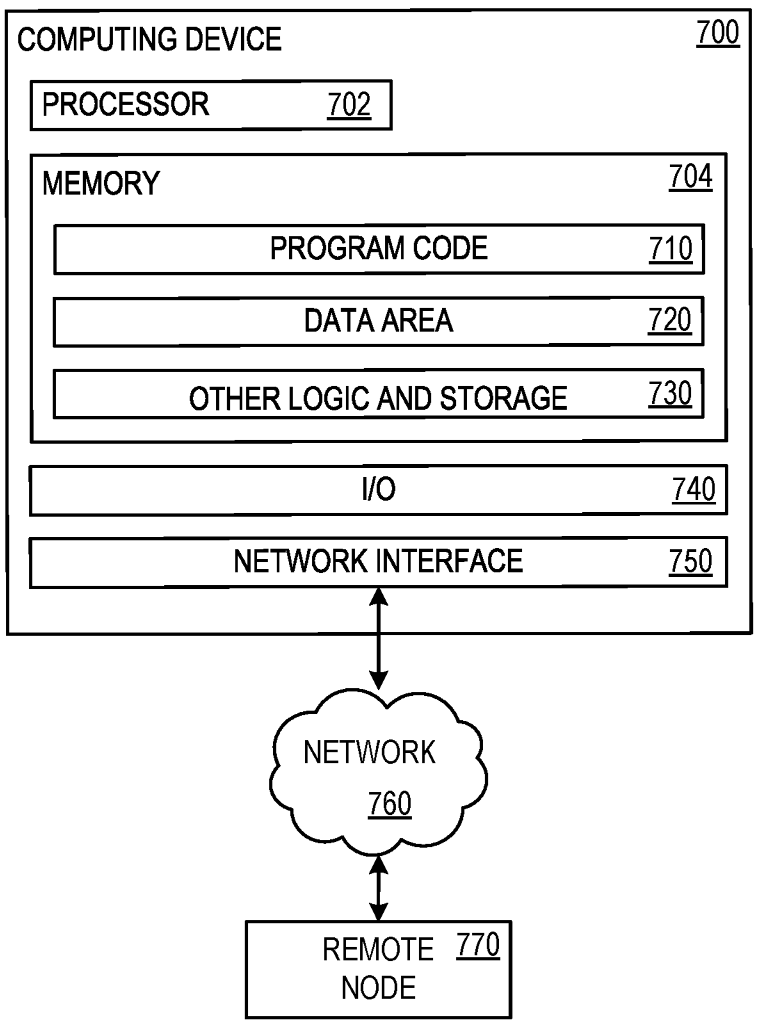
FIG. 7 illustrates a block diagram of a computing device suitable for implementing various aspects of the disclosure.

FIG. 7 illustrates a block diagram of computing device 700 that may be used as any component described herein that may require computational or storage capacity. Computing device 700 has at least a processor 702 and a memory 704 that holds program code 710, data area 720, and other logic and storage 730. Memory 704 is any device allowing information, such as computer executable instructions and/or other data, to be stored and retrieved. For example, memory 704 may include one or more random access memory (RAM) modules, flash memory modules, hard disks, solid-state disks, persistent memory devices, and/or optical disks. Program code 710 comprises computer executable instructions and computer executable components including instructions used to perform operations described herein. Data area 720 holds data used to perform operations described herein. Memory 704 also includes other logic and storage 730 that performs or facilitates other functions disclosed herein or otherwise required of computing device 700. An input/output (I/O) component 740 facilitates receiving input from users and other devices and generating displays for users and outputs for other devices. A network interface 750 permits communication over external network 760 with a remote node 770, which may represent another implementation of computing device 700. For example, a remote node 770 may represent another of the above-noted nodes within architecture 100.

ADDITIONAL EXAMPLES

An example system comprises: a processor; and a computer-readable medium storing instructions that are operative upon execution by the processor to: determine, by a wireless network, a speed of a UE that is registered with the wireless network (and in connected mode); and based on at least determining that the speed of the UE exceeds a first threshold speed, prioritize the lowest frequency band for the UE, wherein prioritizing the lowest frequency band comprises: based on at least the UE already using the lowest frequency band: not instructing the UE to perform an inter-frequency measurement; and/or not performing an inter-frequency handover to a higher frequency band; and based on at least the UE not already using the lowest frequency band: instructing the UE to perform an inter-frequency measurement for the lowest frequency band; and based on at least the lowest frequency band being available for the UE, instructing a handover of the UE to the lowest frequency band.

An example method of wireless communication comprises: determining, by a wireless network, a speed of a UE that is registered with the wireless network (and is in connected mode); and based on at least determining that the speed of the UE exceeds a first threshold speed, prioritizing the lowest frequency band for the UE, wherein prioritizing the lowest frequency band comprises: based on at least the UE already using the lowest frequency band: not instructing the UE to perform an inter-frequency measurement; and/or not performing an inter-frequency handover to a higher frequency band; and based on at least the UE not already using the lowest frequency band: instructing the UE to perform an inter-frequency measurement for the lowest frequency band; and based on at least the lowest frequency band being available for the UE, instructing a handover of the UE to the lowest frequency band.

One or more example computer storage devices has computer-executable instructions stored thereon, which, upon execution by a computer, cause the computer to perform operations comprising: determining, by a wireless network, a speed of a UE that is registered with the wireless network; and based on at least determining that the speed of the UE exceeds a first threshold speed, prioritizing the lowest frequency band for the UE, wherein prioritizing the lowest frequency band comprises: based on at least the UE already using the lowest frequency band: not instructing the UE to perform an inter-frequency measurement; and/or not performing an inter-frequency handover to a higher frequency band; and based on at least the UE not already using the lowest frequency band: instructing the UE to perform an inter-frequency measurement for the lowest frequency band; and based on at least the lowest frequency band being available for the UE, instructing a handover of the UE to the lowest frequency band.

Alternatively, or in addition to the other examples described herein, examples include any combination of the following:

- based on at least determining that the speed of the UE is below a second threshold speed, ceasing to prioritize the lowest frequency band for the UE;
- the first threshold speed is above 60 kph;
- the first threshold speed is above 64 kph;
- the first threshold speed is above 79 kph;
- the second threshold speed is below 60 kph;
- the second threshold speed is below 57 kph;
- the second threshold speed is below 41 kph;
- prioritizing the lowest frequency band further comprises, based on at least the UE not already using the lowest frequency band, instructing the UE to perform an inter-frequency measurement for a lower frequency band that is above the lowest frequency band;
- prioritizing the lowest frequency band further comprises, based on at least the UE not already using the lowest frequency band, based on at least the lower frequency band being available for the UE, instructing a HO of the UE to the lower frequency band;
- a base station of the wireless network, that is serving the UE, determines the speed of the UE;
- the speed of the UE, as determined by the wireless network, is a radial speed of the UE relative to the base station that is serving the UE;
- prioritizing the lowest frequency band for the UE is further based on at least the UE being in connected mode;
- based on at least the UE being in idle mode, not prioritizing the lowest frequency band for the UE;
- based on at least determining that the speed of the UE is below the second threshold speed, prioritizing the highest frequency band for the UE; and
- the wireless network comprises a cellular network.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:

determining, by a wireless network, a speed of a user equipment (UE) that is registered with the wireless network; and based on at least determining that the speed of the UE exceeds a first threshold speed, prioritizing a lowest frequency band for the UE, wherein prioritizing the lowest frequency band comprises:

based on at least the UE already using the lowest frequency band:

not instructing the UE to perform an inter-frequency measurement; and/or not performing an inter-frequency handover to a higher frequency band; and based on at least the UE not already using the lowest frequency band:

instructing the UE to perform an inter-frequency measurement for the lowest frequency band; and based on at least the lowest frequency band being available for the UE, instructing a handover of the UE to the lowest frequency band.

2. The method of claim 1, further comprising:

based on at least determining that the speed of the UE is below a second threshold speed, ceasing to prioritize the lowest frequency band for the UE.

3. The method of claim 2, wherein the first threshold speed is above 60 kilometers per hour (kph) and the second threshold speed is below 60 kph.

4. The method of claim 1, wherein prioritizing the lowest frequency band further comprises:

based on at least the UE not already using the lowest frequency band:

instructing the UE to perform an inter-frequency measurement for a lower frequency band that is above the lowest frequency band; and based on at least the lower frequency band being available for the UE, instructing a handover of the UE to the lower frequency band.

5. The method of claim 1, wherein a base station of the wireless network, that is serving the UE, determines the speed of the UE.

6. The method of claim 5, wherein the speed of the UE, as determined by the wireless network, is a radial speed of the UE relative to the base station that is serving the UE.

7. The method of claim 1, wherein prioritizing the lowest frequency band for the UE is further based on at least the UE being in connected mode; and wherein the method further comprises:

based on at least the UE being in idle mode, not prioritizing the lowest frequency band for the UE.

8. A system comprising:

a processor; and a computer-readable medium storing instructions that are operative upon execution by the processor to:

determine, by a wireless network, a speed of a user equipment (UE) that is registered with the wireless network; and based on at least determining that the speed of the UE exceeds a first threshold speed, prioritize a lowest frequency band for the UE, wherein prioritizing the lowest frequency band comprises:

based on at least the UE already using the lowest frequency band:

not instructing the UE to perform an inter-frequency measurement; and/or not performing an inter-frequency handover to a higher frequency band; and based on at least the UE not already using the lowest frequency band:

instructing the UE to perform an inter-frequency measurement for the lowest frequency band; and based on at least the lowest frequency band being available for the UE, instructing a handover of the UE to the lowest frequency band.

9. The system of claim 8, wherein the instructions are further operative to:

based on at least determining that the speed of the UE is below a second threshold speed, ceasing to prioritize the lowest frequency band for the UE.

10. The system of claim 9, wherein the first threshold speed is above 60 kilometers per hour (kph) and the second threshold speed is below 60 kph.

11. The system of claim 8, wherein prioritizing the lowest frequency band further comprises:

based on at least the UE not already using the lowest frequency band:

instructing the UE to perform an inter-frequency measurement for a lower frequency band that is above the lowest frequency band; and based on at least the lower frequency band being available for the UE, instructing a HO of the UE to the lower frequency band.

12. The system of claim 8, wherein a base station of the wireless network, that is serving the UE, determines the speed of the UE.

13. The system of claim 12, wherein the speed of the UE, as determined by the wireless network, is a radial speed of the UE relative to the base station that is serving the UE.

14. The system of claim 8, wherein prioritizing the lowest frequency band for the UE is further based on at least the UE being in connected mode; and wherein the instructions are further operative to:

based on at least the UE being in idle mode, not prioritizing the lowest frequency band for the UE.

15. One or more non-transitory computer storage devices having computer-executable instructions stored thereon, which, upon execution by a computer, cause the computer to perform operations comprising:

determining, by a wireless network, a speed of a user equipment (UE) that is registered with the wireless network; and based on at least determining that the speed of the UE exceeds a first threshold speed, prioritizing a lowest frequency band for the UE, wherein prioritizing the lowest frequency band comprises:

based on at least the UE already using the lowest frequency band:

not instructing the UE to perform an inter-frequency measurement; and/or not performing an inter-frequency handover to a higher frequency band; and based on at least the UE not already using the lowest frequency band:

instructing the UE to perform an inter-frequency measurement for the lowest frequency band; and based on at least the lowest frequency band being available for the UE, instructing a handover of the UE to the lowest frequency band.

16. The one or more non-transitory computer storage devices of claim 15, wherein the operations further comprise:

based on at least determining that the speed of the UE is below a second threshold speed, ceasing to prioritize the lowest frequency band for the UE.

17. The one or more non-transitory computer storage devices of claim 16, wherein the first threshold speed is above 60 kilometers per hour (kph) and the second threshold speed is below 60 kph.

18. The one or more non-transitory computer storage devices of claim 16, wherein the first threshold speed is above 79 kilometers per hour (kph) or the second threshold speed is below 41 kph.

19. The one or more non-transitory computer storage devices of claim 15, wherein a base station of the wireless network, that is serving the UE, determines the speed of the UE.

20. The one or more non-transitory computer storage devices of claim 15, wherein prioritizing the lowest frequency band for the UE is further based on at least the UE being in connected mode; and wherein the operations further comprise:

based on at least the UE being in idle mode, not prioritizing the lowest frequency band for the UE.

* * * * *